Patented July 24, 1951

2,561,380

UNITED STATES PATENT OFFICE 2,561,380

WATER INSOLUBLE CARBOXYLIC ACID SOAP-HEAVY METAL SALT OF HYDROXY QUINOLINE FUNGICIDAL COMPOSITION AND PREPARATION THEREOF

Victor N. Kalberg, Chicago, Ill., assignor to Scientific Oil Compounding Company, Inc., a corporation of Illinois No Drawing. Application April 6, 1948,
Serial No. 19,432

35 Claims. (Cl. 260—270)

1

This invention relates to fungicidal and fungistatic compositions and to methods of making the same. In particular it relates to methods of preparing compounds from the water-insoluble metal salts of the hydroxyquinolines, particularly the alkaline earth metal salts, aluminum salt, and heavy metal salts of 8-hydroxyquinoline, which compounds are capable of being dissolved or dispersed readily in suitable solvents or vehicles to form commercially usable solutions or dispersions which have particular usefulness as fungicidal and/or fungistatic sprays, impregnants and coatings.

The compounds of the present invention are the products of reaction under the influence of heat of a water-insoluble soap, particularly a water-insoluble soap of an alkaline earth metal or a heavy metal or aluminum and a water-insoluble salt of an hydroxy-quinoline, particularly an alkaline earth metal salt or heavy metal salt or aluminum salt of an hydroxyquinoline and particularly an hydroxyquinoline having the phenolic hydroxy group located in any position in the benzene nucleus of the quinoline radical, or in more than one such position. Examples of these salts are the calcium, barium, magnesium, strontium, lead, mercury, manganese, cobalt, nickel, iron, copper, cadmium, silver, thallium, tin, zinc and aluminum salts of 5-hydroxyquinoline, 6-hydroxyquinoline, 7-hydroxyquinoline or 8-hydroxyquinoline. The preferred compounds of the present invention are the products formed by reacting a heavy metal soap, particularly a copper, zinc or nickel soap, with a heavy metal salt of 8-hydroxyquinoline, particularly the copper, zinc or nickel salt of 8-hydroxyquinoline.

Of the above named preferred compounds, those formed by reacting a copper, zinc or nickel soap with the copper salt of 8-hydroxyquinoline are the most desired because of their vastly superior fungicidal and/or fungistatic properties, in which respects they are exceptional. The invention will, therefore, be described with particular emphasis on these compounds.

Copper-8-quinolinolate, the copper salt of 8-hydroxyquinoline, is a known fungicidal material and is particularly effective as a fungicide and as a mildew-proofing agent for wood, leather, cotton, wool and other fabric materials made from organic fibers, protective coatings derived from resins, either natural or synthetic, paints, varnishes, and the like. Notwithstanding the effectiveness of copper-8-quinolinolate as a fungicide its use for that purpose has been extremely limited in the past due to its insolubility in water and particularly due to its insolubility in oils, oily materials, benzol, toluol, petroleum thinners or mineral spirits and like organic solvents or thinners commonly used in the coating composition art.

In accordance with the present invention compounds may be made by reacting a water-insoluble soap, especially a zinc, copper or nickel soap, with copper-8-quinolinolate or other alkaline earth metal salt or heavy metal salt or aluminum salt of an hydroxyquinoline, at an elevated temperature, and these compounds are readily soluble in, or may be dispersed readily in, oils, oily materials, benzol, toluol and the like, and the resulting solutions or dispersions are very effective fungicidal and/or fungistatic compositions. The proportions of the reactants which may be used in preparing this composition may be varied rather widely, as desired, but it is preferred to use equivalent proportions and from the practical standpoint, at least an equal amount of a water-insoluble soap, with respect to the quinolinolate, on a weight basis, should be used. A substantial excess of metal soap with respect to quinolinolate may be used in carrying out the reaction, without being wasteful of the material, since the proportions of metal soap in excess of that required to react with the quinolinolate serves, if in sufficient excess, or assists in serving, as a reaction medium in which the reaction product of the metal soap and the quinolinolate is soluble at elevated temperatures of from about 150–275° F. and higher, depending upon the particular reaction medium. The reaction temperature may be varied widely, depending upon the particular metal soap used, from about 200° F. to 550° F. and higher.

The reaction is carried out in a reaction medium, preferably in a reaction medium which is capable of withstanding temperatures of about 400–550° F. and in which the reaction product is soluble at the elevated temperatures referred to above. This reaction medium may be the same metal soap used in making the reaction product as noted above, or it may be some other metal soap or any mixture of such soaps. It may also be a mixture of a metal soap and a higher fatty acid having at least six carbon atoms in the molecule, such as one of the soap-forming fatty acids named below, or it may be one such higher fatty acid or a mixture of such fatty acids, or it may be a vegetable or animal oil such as linseed oil, China-wood oil, cottonseed oil, soybean oil, palm oil, coconut oil, sardine or other fish oil, tallow and lard, or the like, or the mixtures of fatty acids derived from these oils. Preferred reaction media in accordance with the present invention are oleic acid, linoleic acid, caproic acid, caprylic acid, tall oil, palmitic acid, stearic acid, rosin, abietic acid, and similar soap-forming acids or any combination thereof.

The metal soaps which are used as reactants in accordance with the present invention are water-insoluble soaps of a metal or a mixture of metals and a soap-forming acid or a mixture of such acids. Thus, the soaps may be soaps of calcium, barium, magnesium, mercury, lead, cadmium, silver, thallium, manganese, cobalt, nickel, iron, copper, tin, aluminum and the like. The preferred soaps are the copper, zinc and nickel soaps because the results obtained with these soaps are markedly superior to those obtainable with the other soaps referred to herein.

The soap-forming acids used in forming the aforesaid metal soaps include caproic acid, caprylic acid, capric acid, lauric acid, myristic acid, palmistic acid, stearic acid, oleic acid, linoleic acid, linolenic acid, palmitoleic acid, melissic acid, hydroxystearic acid, ricinoleic acid, and the like, and mixtures thereof. The preferred soap-forming fatty acids or materials are those saturated and unsaturated higher aliphatic acids containing from twelve to eighteen carbon atoms, and rosin. Other soap-forming fatty acids which may be used in forming the metal soaps used in accordance with the present invention are the mixed higher fatty acids derived from animal or vegetable sources such as, for example, sardine and other fish oils, lard, coconut oil, sesame oil, soybean oil, tung oil, corn oil or partially or completely hydrogenated derivatives of such oils, fatty acids derived from carnauba, spermaceti, beeswax, candelilla wax and like waxes, and carboxylic acids derived from petroleum or other hydrocarbons. Other soap-forming acids which may be used are naphthenic acid, tall oil fatty acids, and hydroaromatic acids such as abietic acid and the like.

The following example is illustrative of a method of preparing the reaction products of the present invention. In this example the heavy metal soap, specifically zinc oleate, is formed in situ, and the reaction medium is oleic acid along with a relatively small proportion of zinc oleate in solution in the oleic acid. Also in this example, as well as in all other examples, the term "part" refers to parts by weight.

EXAMPLE 1

100 parts by weight of oleic acid were heated in an open vessel to a temperature of about 200° F. and 10 parts of zinc oxide were added and the mixture was heated, with stirring, up to 420° F. over a period of about 8–10 minutes, at which time the zinc oleate which was formed went into solution in the excess of oleic acid. The solution of zinc oleate was held at a temperature of about 400–430° F. and 10 parts of copper-8-quinolinolate were stirred into the solution. The copper-8-quinolinolate went into solution quickly and the resulting solution was a free flowing mass, substantially clear and free from undissolved matter when observed by the naked eye under a light.

The product maintained its liquid state while hot, but at a temperature below about 120° F. it began to solidify and on cooling to room temperature it caked into a relatively soft mass very smooth to the touch when rubbed between the fingers. This solidified product was soluble in mineral spirits, vegetable oils, fatty acids, and the like with heating. The temperature at which the mass went into solution in the solvent varied with the particular solvent. Thus, for example, with mineral spirits it went into solution at about 175° F., and with linseed oil it went in at about 300° F. The caked solidified product returned to the free flowing liquid state on heating to about 300 to 325° F.

From variations of the procedure of Example 1, it was found that copper-8-quinolinolate readily goes into solution in the zinc oleate solution when that solution is maintained at temperatures of 300° to 430° F. It was found that at temperatures slightly below about 300° F. the copper-8-quinolinolate went into solution very slowly. Its solubility in the zinc oleate solution at about 300° F. was fairly rapid. The solution of the copper-8-quinolinolate in the zinc oleate solution at a temperature of 375–430° F. was prompt.

The novel reaction products of the invention apparently are formed approximately at the time when the quinolinolate dissolves in the reaction medium, for the quinolinolate is insoluble or substantially insoluble in the reaction medium at the reaction temperatures, in the absence of the metal soap. These reaction products are preferably not isolated from the reaction medium, for they may be used in accordance with the present invention in the solution or dispersion which results following the reaction, either with or without further solvent or thinner, as fungicidal and/or fungistatic compositions.

The proportions of copper-8-quinolinolate used in the above example in making the fungicidal composition may be varied widely from about 1 part or less up to about 10½ to 11 parts, the proportions of the other reactant and the reaction medium remaining constant. With amounts of copper-8-quinolinolate below 10 parts the solutions obtained are improved. In general, the character of the solutions obtained improve progressively where the amount of copper-8-quinolinolate used is decreased from the 10 parts in the above example to about 3 parts. Those obtained with amounts of copper-8-quinolinolate below about 3 parts do not differ substantially from those obtained using 3 parts. The differences in solutions referred to are, generally, differences in brilliancy and clarity of solution and in over-all stability as the solution undergoes temperature variations.

The reaction product of a water-insoluble metal soap and copper-8-quinolinolate or other water-insoluble metal salt of an hydroxy-quinoline in accordance with the present invention, either in the hot liquid state or in the solidified state or in the reheated and reliquefied state, may be used as such as a fungicidal and/or fungistatic composition, as may also the hot and cold products of Example 1. The solidified products may be used as rubbing compounds to impart fungicide-resisting properties to leather, for example. The hot liquid products may be used as sprays, coatings or impregnants for wood, leather and other organic materials, in accordance with conventional procedures.

Although the solutions or dispersions of the reaction products produced in accordance with Example 1 have utility per se, their use as such is not desirable because of the high percentages of copper-8-quinolinolate present in the composition in the form of the reaction product, which is wasteful of the material, and because the hot liquid product, the solidified product and the reliquefied product do not have sufficient penetrating properties at normal room temperatures of about 70-75° F. Accordingly, the reaction product of the present invention may constitute a base material which for commercial purposes may be dissolved in or compounded with suitable vehicles before use, to bring the reaction product to the desired low concentration and to impart to the product desired penetrating and film-forming properties. The base material can be dispersed in water, with the aid of emulsifying agents, and it may be used in an aqueous dispersion if desired.

EXAMPLE 2

100 parts by weight of oleic acid were heated in an open vessel to a temperature of about 200° F. and 10 parts of nickel acetate were added and the mixture was heated, with stirring, up to 420° F. over a period of about ½ hour, at which time all of the acetic acid which was formed was driven off and the nickel oleate which was formed went into solution in the excess of oleic acid. This solution was cooled to about 200° F. and 10 parts of copper-8-quinolinolate were stirred into the solution and the solution was brought up to about 300° F., at which time the copper-8-quinolinolate went into solution. The resulting solution had greater clarity and brilliancy than the solution of Example 1. When this solution was cooled to room temperature it thickened somewhat, but retained its liquid state. This product when thinned with mineral spirits had excellent penetrating properties and functioned effectively as a fungicidal and fungistatic material.

The foregoing example was repeated using, respectively, equivalent amounts of caproic acid, caprylic acid, lauric acid and tall oil, in lieu of oleic acid, and the resulting compounds had both fungistatic and fungicidal efficacy.

In accordance with the present invention I have prepared commercially suitable fungicidal compositions containing the reaction product of the present invention, which at normal room temperatures are in a free flowing liquid state, with the reaction product in uniform solution or dispersion throughout. These compositions remain liquid and constant at temperatures even somewhat below 70° F. Not only do they have particularly effective fungicidal, penetrating and film-forming properties, but, surprisingly, they impart strength to materials treated therewith. This will be evident from the test results carried out with the composition produced in accordance with the following Example 3, which composition was identified in these tests as Dri-Seal No. 940.

EXAMPLE 3

255 lbs. of zinc resinate (8%), 63¾ lbs. of a 100% phenol-formaldehyde resin of the bis-phenol type [a B-stage resin having an acid number of 83, a melting point (Wilbur method) of 256° F., and a specific gravity of 20/20° C. of 1.071, and 76.5 lbs. of Z-3 (Gardner-Holdt) heat bodied linseed oil were mixed in an open vessel and the mixture was heated at about 550° F., with stirring, for one hour. The mass was then cooled to about 300° F. and 43.4 lbs. of copper-8-quinolinolate were added with constant agitation. The temperature was then raised gradually to 400-420° F. at which time the copper-8-quinolinolate went into solution. Total elapsed time for this stage of the process was one hour.

The heat was removed and when the temperature of the solution of the copper-8-quinolinolate-zinc resinate reaction product was at about 400° F., 337 lbs. of zinc naphthenate (8%) were added with constant agitation. This effected a temperature drop in the mass to about 275° F. There was then added to the mass 325 lbs. of 125°–127° F. M. P. paraffin wax and the mixture was stirred until the wax went into solution. At this stage of the process the temperature had dropped to about 200° F. The mass was then thinned with a solution consisting of 4422 lbs. of a solvent of petroleum origin (mineral spirits), 25½ lbs. of lead naphthenate (24%) and 74 lbs. of cobalt naphthenate (6%).

The petroleum solvent (mineral spirits) used as a thinner in the above example had an I. B. of 325° and an E. P. of 388°, A. P. I. gravity at 60° F. of 45.5, a sp. gr. at the same temperature of 0.799, and a flash point (TCC) of 116° F. Toluol, xylol, carbon tetrachloride and other petroleum solvents or coal tar solvents may be used in lieu of the thinner in the foregoing example.

The composition obtained in accordance with Example 3 was a free-flowing liquid at 70° F. It contained 2.5% of copper-8-quinolinolate based on the weight of the solids (on materials other than the thinner). Tests were carried out on this material (identified as Dri-Seal No. 940) to determine the efficacy of the material as a fungicide and/or fungistat and to determine its effect on materials treated therewith. The tests were as follows:

Dri-Seal No. 940 was applied to wood samples 1" x 3" and leather squares 2" x 2" by soaking under vacuum for 20 minutes and drying for 6 hours. The treated specimens and untreated control specimens were placed on a sterile nutrient agar medium with a pH of 5.5, which was used for the substratum in petri dishes. The specimens were sprayed with a spore suspension of the following organisms and incubated at 30° C. for 14 days:

*Chaetomium globosum*
*Penicillium citrinum*
*Aspergillus niger*
*Aspergillus terreus*
*Trichoderma viride*
*Aspergillus flavus*

At the conclusion of this test period it was found that fungi were growing over the entire surface of the leather and wood control specimens and that no growth existed on the treated wood and leather specimens.

The treated wood and leather specimens were polished with a conventional polishing material and a high polish was obtained thereon.

In additional tests, samples of 10 oz. duck were cut into 4" x 6" squares, the duck was washed in soap suds, rinsed thoroughly and dried. 10 squares were dipped into Dri-Seal No. 940, drained and dried for 6 hours. 5 of these dried squares were leached for 24 hours and the remaining 5 were unleached. 7 squares of washed duck were left untreated as a control.

All of the squares were buried for 14 days in a soil burial chamber at 90° F. with 98% relative humidity after their tensile strengths were taken on a 400 lb. vertical Scott tester. After a 14-day exposure period, all specimens were washed thoroughly in warm water and dried in an air conditioning chamber for 24 hours. Tensile strengths were then taken on the same Scott tester. The results are recorded in the following table:

Table

| | T. S. in lbs. Not Buried | T. S. in lbs. Buried | Per Cent Loss | Per Cent Gain |
|---|---|---|---|---|
| 940 | 310 | 343.2 | | 12.3 |
| 940 Leached | 353 | 355.2 | | 15.3 |
| Untreated | 301.2 | 13.8 | 95.5 | |

The present invention is not to be construed as limited to the details of Example 3. Thus, for example the phenol-formaldehyde resin may be omitted or it may be replaced by any resin used in varnish making such as rosin, kauri, copal, congal, ester gum, reaction products of rosin, maleic anhydride and a polyhydric alcohol such as glycol, glycerin, pentaerythritol, sorbitol, mannitol, as well as other synthetic resins. The paraffin wax may be omitted or it may be replaced by any other suitable water-repellent wax, either animal, vegetable, mineral or synthetic, such as beeswax, carnauba wax, spermaceti wax, candelilla wax, and the like. The zinc resinate in the example may be replaced by alkaline earth metal or other heavy metal soaps and the linseed oil may be replaced by other suitable vehicles, such as those named above. In general, the vehicle may be any vegetable oil, either drying or semi-drying or non-drying, including castor oil and dehydrated castor oil or a combination of either one or both of these oils with one or more of the vegetable oils named above. It is, of course, manifest that the alkaline earth metal and heavy metal soap may be formed in situ, as in Example 1.

The zinc naphthenate used in preparing the composition of Example 3 functions primarily as a stabilizing material to hold the various solid materials in solution in the thinner and to accelerate drying of the composition. It also functions as an anti-oxidant. Zinc naphthenate can be replaced by small amounts of other suitable anti-oxidants such as phenyl salicylate (in amounts up to about 3%), or by tertiary butyl catechol, hydroquinone and guaiacol (in amounts up to about ½ to 1%). It is preferred to use the relatively larger amounts of the zinc naphthenate of the example, however, because of its stabilizing and drying properties. The lead naphthenate and cobalt naphthenate serve as driers and may, of course, be replaced by other suitable driers. Where phenyl salicylate is used in the composition, it is found that the stability to light of textiles impregnated with it is improved.

In Example 3, the copper-8-quinolinolate may be varied from about 1 to 3½% by weight, based on the weight of all the constituents of the composition other than the thinner. The amount of zinc resinate used may also be varied, up or down about 25% from the amount stated. The linseed oil may be varied up or down 25% from the amount stated and the zinc naphthenate can be varied 50% up or down from the amount stated.

The latter can, of course, be omitted, as can also the resin and wax, as noted above. If it is desired to enhance the water-proofing properties of the composition the amount of wax used may be increased up to 100% of that stated. Other variations will readily suggest themselves to a skilled worker in the art.

Additional reaction products in accordance with the present invention were prepared as described in the following Examples 4 to 14 and tested to determine the efficacy thereof as fungistats. Solutions of each of these products were used to impregnate leather specimens and these specimens were placed, along with a control specimen, in petri dishes containing a substratum consisting of a sterile nutrient agar medium having a pH of 5.5. The specimens were sprayed with a spore suspension similar to that described above and incubated at 30° C. for 4 days. Fungi were growing over the entire surface of the control specimen at the conclusion of the test period, whereas the treated specimens were substantially free of such growth. Some of the treated specimens had no fungus growth thereon, as observed with the naked eye, even on the 14th day.

The specimen treated with the reaction product of nickel caproate and copper-8-quinolinolate, prepared in accordance with Example 13, was remarkably clean of fungus growth on the 16th day. It was observed during the test period that there was a clean field of substratum surrounding this specimen, thereby indicating that the impregnant was having a lethal effect on the fungi.

EXAMPLE 4

625 parts of nickel oleate were dissolved in 565 parts of oleic acid. This solution was heated to 450° F. and 120 parts of nickel-8-quinolinolate were added with stirring. The addition is preferably accomplished in increments of 10 to 20 parts, one increment dissolving completely before another is added. The mixture was heated with stirring for about 10 minutes and allowed to cool. The resulting solution was a free flowing mass at room temperature. Solutions of this material in benzol, toluol and petroleum thinner (mineral spirits) were perfectly clear and light green in color.

EXAMPLE 5

625 parts of nickel oleate were dissolved in 565 parts of oleic acid. This solution was heated to about 450° F. and 120 parts of barium-8-quinolinolate were added in increments of 10 to 20 parts, with stirring. Heating was continued for several minutes after solution was complete. This material was freely soluble in mineral spirits, benzol and toluol at room temperature.

EXAMPLE 6

625 parts of nickel oleate were dissolved in 565 parts of oleic acid. This solution was heated to about 450° F. and 120 parts of manganese-8-quinolinolate were added in increments of 10 to 20 parts, with stirring. Heating was continued for several minutes after solution was complete. The resulting solution was allowed to cool to a slightly viscous oil at room temperature. This composition was very soluble in petroleum spirits, toluol and benzol at room temperature.

EXAMPLE 7

620 parts of copper oleate were dissolved in 565 parts of oleic acid. This solution was heated to about 450° F. and 120 parts of zinc-8-quinolinolate were added to increments of 10 parts each with stirring. Heating and stirring were continued for about 15 minutes after the addition was completed. On cooling, a semi-solid mass resulted. One part of this material was soluble in about 15 parts of mineral spirits, and 10 parts of benzol or toluol at 70° F.

EXAMPLE 8

630 parts of copper oleate were dissolved in 565 parts of oleic acid. This solution was heated to about 450° F. and 120 parts of aluminum-8-quinolinolate were added in increments of about 30 parts with stirring. On cooling, a semi-solid brown mass resulted. This material could be prepared in concentrations of 10-15% in petroleum spirits, benzol and toluol.

EXAMPLE 9

630 parts of copper oleate were dissolved in 565 parts of oleic acid. This solution was heated to about 450° F. and 120 parts of copper-8-quinolinolate were added in increments of 10 parts with stirring. Heating and stirring were continued for about 20 minutes after the addition of the last increment. On cooling a very viscous liquid resulted. This material gave a dark brown solution in mineral spirits. It was also soluble in benzol and toluol.

EXAMPLE 10

630 parts of copper oleate were dissolved in 565 parts of oleic acid. This solution was heated to about 450° F. and 120 parts of nickel-8-quinolinolate were added in increments of 10 to 20 parts. Heating was continued for 10 minutes, and the solution allowed to cool to a slightly viscous liquid at room temperature. One part of this material could be dissolved in 12 parts of mineral spirits, or 10 parts of benzol or toluol at 75° F.

EXAMPLE 11

630 parts of copper oleate were dissolved in 565 parts of oleic acid. This solution was heated to about 450° F. and 120 parts of lead-8-quinolinolate were added gradually with stirring. Solution was effected immediately. On cooling a resultant solid material was obtained. This material was soluble in benzol, toluol and petroleum thinner.

EXAMPLE 12

875 parts of aluminum oleate were dissolved in 565 parts of oleic acid. This solution was heated to about 450° F. and 60 parts of aluminum-8-quinolinolate were cautiously added in increments of 5 parts with stirring. Strong foaming resulted after each addition. The solution was carefully heated with stirring for 30 minutes after the addition of the final increment, at which time solution was complete. When cooled this material was slightly soluble in petroleum thinner, but more soluble in benzol or toluol.

EXAMPLE 13

292 parts of nickel caproate were dissolved in 234 parts of caproic acid. This solution was heated to about 350° F. and 70 parts of copper-8-quinolinolate were added in increments of 10 parts with stirring. On cooling a brownish green oil resulted. This oil was soluble in petroleum thinner, benzol and toluol.

EXAMPLE 14

630 parts of zinc stearate and 570 parts of stearic acid were melted and heated with stirring to 450° F. 75 parts of copper-8-quinolinolate were added in increments of 5 to 10 parts, each increment being completely dissolved before the next was added. The solution was then heated for 15 minutes, and allowed to cool to room temperature, a dark green solid resulting. This material was difficultly soluble in petroleum thinner at 75° F. and slightly soluble at 175° F. One part was soluble in 20 parts of benzol or toluol at 75° F.

Examples 2, 4, 5 and 6 were repeated, using, however, barium oleate and magnesium oleate, individually, in lieu of the metal soaps of these examples. In each instance the products obtained were soluble in benzol, toluol and petroleum thinner. These products have pronounced fungistatic properties.

In each of the foregoing Examples 1 to 14, inclusive, the metal salt of the hydroxyquinoline used as a reactant has the phenolic hydroxy group located in the benzene nucleus of the quinoline radical. These salts are the preferred class of reactants in accordance with my invention, for the products resulting from the reaction of these salts with water-insoluble soaps have very pronounced fungistatic and/or fungicidal properties. My invention, however, includes also the products of reaction of a water-insoluble soap and a water-insoluble salt of an hydroxyquinoline wherein the nitrogen ring contains one or more hydroxy groups which are either the sole hydroxy groups of the compound or hydroxy groups additional to those in the benzene nucleus. Examples of such hydroxyquinoline salts are the alkaline earth metal and heavy salts of 2-hydroxyquinoline (carbostyril), 4-methyl-2-hydroxyquinoline (4-methyl carbostyril), 4-hydroxyquinoline (kynurine), and 2-methyl-4-hydroxyquinoline (2-methyl kynurine).

The compositions of the present invention not only inhibit the growth of fungus organisms, but many also kill the activity of all existing growth on contact. Furthermore, textiles, leather, wood and the like impregnated with the fungicidal compositions of the present invention are not attacked to any appreciable extent by soil animal life and resist the action of bacteria and insects. These compositions lend themselves for use as insecticides and for preventing and combating diseases of plant life, both those diseases which attack the parts of plants above ground and diseases such as rot which attack underground parts of the plant.

The compositions of the present invention are stable for long periods of time. Many of these compositions, the composition of Example 2, for example, are substantially non-toxic to human beings and, therefore, lend themselves for general use.

This application is a continuation-in-part of my copending application Serial No. 786,324, filed November 15, 1947.

I claim:

1. The method of forming a composition of matter consisting of reacting at a temperature between about 200° F. and the lowest decomposition temperature of the reactants, a water-insoluble metal carboxylic acid soap and a water-insoluble metal salt of an hydroxyquinoline.

2. The method of forming a composition of matter consisting of reacting at a temperature between about 200° F. and the lowest decomposition temperature of the reactants, a water-insoluble metal carboxylic acid soap and a heavy metal salt of an hydroxyquinoline.

3. The method of forming a composition of matter consisting of reacting at a temperature between about 200° F. and the lowest decomposition temperature of the reactants, a water-insoluble heavy metal carboxylic acid soap and a heavy metal salt of an hydroxyquinoline.

4. The method of forming a composition of matter consisting of reacting at a temperature between about 200° F. and the lowest decomposition temperature of the reactants, a water-insoluble metal carboxylic acid soap and a water-insoluble metal-8-quinolinolate.

5. The method of forming a composition of matter consisting of reacting at a temperature between about 200° F. and the lowest decomposition temperature of the reactants, a water-insoluble heavy metal carboxylic acid soap and a heavy metal-8-quinolinolate.

6. The method of forming a composition of matter consisting of heating below the lowest decomposition temperature of the reactants, a water-insoluble metal carboxylic acid soap and a water-insoluble metal salt of an hydroxyquinoline.

7. The method of forming a composition of matter consisting of heating at a temperature below the lowest decomposiiton temperature of the reactants, a water-insoluble metal carboxylic acid soap and an alkaline earth metal salt of an hydroxyquinoline.

8. The method of forming a composition of matter consisting of heating at a temeprature below the lowest decomposition temperature of the reactants, a water-insoluble heavy metal carboxylic acid soap and a heavy metal salt of an hydroxyquinoline.

9. The method of forming a composition of matter consisting of heating at a temperature below the lowest decomposition temperature of the reactants, a water-insoluble heavy metal carboxylic acid soap and a heavy metal-8-quinolinolate.

10. As a fungistatic and/or fungicidal composition, the product produced by the method of claim 8.

11. The method of forming a composition of matter consisting of heating below the lowest temperature of the reactants, a water-insoluble heavy metal carboxylic acid soap and a heavy metal salt of an hydroxyquinoline wherein the phenolic hydroxy group is located in any position in the benzene nucleus of the quinoline radical.

12. As a fungistatic and/or fungicidal composition, the product produced by the method of claim 11.

13. The method of forming a composition of matter consisting of heating below the lowest decomposition temperature of the reactants, a water-insoluble heavy metal carboxylic acid soap and copper-8-quinolinolate.

14. As a fungistatic and/or fungicidal composition, the product produced by the method of claim 13.

15. As a fungistatic and/or fungicidal composition, the product produced by the method of claim 6.

16. The method of forming a composition of matter consisting of heating below the lowest decomposition temperature of the reactants, a water-insoluble metal carboxylic acid soap and a water-insoluble metal salt of an hydroxyquinoline wherein the phenolic hydroxy group is located in any position in the benzene nucleus of the quinoline radical.

17. As a fungistatic and/or fungicidal composition, the product produced by the method of claim 16.

18. The method of forming a composition of matter consisting of heating below the lowest decomposition temperature of the reactants, a water-insoluble metal carboxylic acid soap and a water-insoluble metal-8-quinolinolate.

19. As a fungistatic and/or fungicidal composition, the product produced by the method of claim 18.

20. The method of forming a composition of matter consisting of heating at a temperature below the lowest decomposition temperature of the reactants, a zinc carboxylic acid soap and copper-8-quinolinolate.

21. As a fungistatic and/or fungicidal composition the product produced by the method of claim 20.

22. The method of forming a composition of matter consisting of heating at a temperature below the lowest decomposition temperature of the reactants, zinc oleate and copper-8-quinolinolate.

23. As a fungistatic and/or fungicidal composition the product produced by the method of claim 22.

24. The method of forming a composition of matter consisting of heating at a temperature below the lowest decomposition temperature of the reactants, a nickel carboxylic acid soap and copper-8-quinolinolate.

25. As a fungistatic and/or fungicidal composition the product produced by the method of claim 24.

26. The method of forming a composition of matter consisting of heating at a temperature below the lowest decomposition temperature of the reactants, nickel oleate and copper-8-quinolinolate.

27. As a fungistatic and/or fungicidal composition the product produced by the method of claim 26.

28. The method of forming a composition of matter consisting of heating at a temperature below the lowest decomposition temperature of the reactants, a copper carboxylic acid soap and copper-8-quinolinolate.

29. As a fungistatic and/or fungicidal composition the product produced by the method of claim 28.

30. The method of forming a composition of matter consisting of heating at a temperature below the lowest decomposition temperature of the reactants, copper oleate and copper-8-quinolinolate.

31. As a fungistatic and/or fungicidal composition the product produced by the method of claim 30.

32. The method of forming a composition of matter consisting of heating at a temperature below the lowest decomposition temperature of the reactants, a copper carboxylic acid soap and zinc-8-quinolinolate.

33. As a fungistatic and/or fungicidal composition the product produced by the method of claim 32.

34. The method of forming a composition of matter consisting of heating at a temperature below the lowest decomposition temperature of the reactants, magnesium oleate and copper-8-quinolinolate.

35. As a fungistatic and/or fungicidal composition the product produced by the method of claim 34.

VICTOR N. KALBERG.

REFERENCES CITED

The following references are of record in the file of this patent:

UNITED STATES PATENTS

| Number | Name | Date |
| --- | --- | --- |
| 1,424,306 | Haskins | Aug. 1, 1922 |
| 2,069,247 | Hoag | Feb. 2, 1937 |
| 2,387,591 | Kolb | Oct. 23, 1945 |
| 2,457,025 | Benignus | Dec. 21, 1948 |

OTHER REFERENCES

Metallic Soaps (1940), Metasap Co., Inc., Harrison, N. J., pp. 1, 3, 4, 6, 11, 15 and 18.

Rigler et al.: Ind. and Engr. Chem., vol. 33, No. 5, May 1941, pp. 693–694.